United States Patent [19]
Williams et al.

[11] Patent Number: 5,720,916
[45] Date of Patent: Feb. 24, 1998

[54] PROCESS FOR MEDICAL ARTICLES OF SYNDIOTACTIC POLYPROPYLENE

[75] Inventors: Joel L. Williams, Cary, N.C.; Yong-Jian Qiu, Myrtle Beach, S.C.; Shel McGuire, Durham, N.C.

[73] Assignee: Becton, Dickinson and Company, Franklin Lakes, N.J.

[21] Appl. No.: 683,936

[22] Filed: Jul. 19, 1996

Related U.S. Application Data

[62] Division of Ser. No. 369,971, Jan. 5, 1995, Pat. No. 5,603,696, which is a continuation of Ser. No. 54,476, Apr. 30, 1993, abandoned.

[51] Int. Cl.$^6$ ............................................. B29C 45/73
[52] U.S. Cl. ........................ 264/328.1; 264/328.16; 264/331.17
[58] Field of Search .............................. 264/328.1, 328.16, 264/331.15, 331.17

[56] References Cited

U.S. PATENT DOCUMENTS

| | | | |
|---|---|---|---|
| 4,239,862 | 12/1980 | Matthews | 525/240 |
| 5,200,131 | 4/1993 | Asanuma et al. | 264/331.17 |
| 5,470,898 | 11/1995 | Syed | 524/84 |
| 5,510,075 | 4/1996 | McGuire et al. | 264/328.16 |
| 5,571,864 | 11/1996 | Bates et al. | 525/88 |
| 5,603,696 | 2/1997 | Williams et al. | 604/93 |

FOREIGN PATENT DOCUMENTS 428972  5/1991  European Pat. Off. .

*Primary Examiner*—Jill L. Heitbrink
*Attorney, Agent, or Firm*—Richard E. Brown

[57] ABSTRACT

Syndiotactic polypropylene is blended with isotactic polypropylene and the blend melt processed into medical articles. The blends have molding cycle times which are up to 12 times shorter that for pure syndiotactic polypropylene.

5 Claims, 3 Drawing Sheets

PROCESS FOR MEDICAL ARTICLES OF SYNDIOTACTIC POLYPROPYLENE

This is a division of application Ser. No., 08/369,971, filed Jan. 5, 1995, now U.S. Pat. No. 5,603,696, which is a continuation of application Ser. No. 08/054,476 filed on Apr. 30, 1993, abandoned.

BACKGROUND OF THE INVENTION

1. Field of the Invention

This invention relates to plastic articles, and more particularly relates to medical articles of syndiotactic polypropylene compositions and a process for their manufacture.

2. Background of the Invention

Molding is a process in which melted or plasticized polymeric material is forced into a mold where it is held until removed in a solid state having a shape which duplicates the cavity of the mold. The process consists of three basic operations:

1) raising the temperature of the plastic to a point where it will flow under pressure into the mold cavity,
(2) allowing the plastic to solidify in the mold (conventionally referred to as hold time) while maintaining pressure during removal of heat, and
(3) opening the mold to eject the plastic permanently frozen in the shape of the mold. The productivity of the molding operation depends on the speed of melting the plastic, the speed of injection and ejection, and the hold time required to cool and solidify the product in the mold. Thus, in the molding art, cycle time is defined as the time required for one complete operation of a molding press from closing time to closing time. In most molding operations, the largest part of the cycle time is the hold time, which generally accounts for up to 80% of the cycle time, and may be as high as 95%.

Prolypropylene has long been used in molding and extruding operations for articles such as containers and films for the food packaging industry, and is known to exist in three forms. In isotactic polypropylene (IPP), the methyl groups are attached to the tertiary carbon atoms of successive monomeric units on the same side of a hypothetical plane through the polymer chain. Syndiotactic polypropylene (SPP) has the methyl groups attached on alternating sides of the polymer chain. Atactic polypropylene (APP) has the methyl groups attached randomly with respect to the polymer chain. APP is essentially a waxy product of low melting point whereas SPP and IPP are crystalline and of higher melting point.

Conventional molding and extruding grades of polypropylene are substantially isotactic, and, depending on the polymerization catalyst and conditions, contain various amounts of monomeric units having other configurations.

SPP, although known for many years in various degrees of syndiotactic purity, has been only a laboratory curiosity until recently. A new crystalline SPP of exceptionally high syndiotacticity purity prepared by a process using syndiospecific metallocene catalysts is disclosed by Ewen et al. in U.S. Pat. No. 4,892,851, incorporated herein by reference. The product is stated to have a higher melting point and lower heat of crystallization than IPP.

European Patent Application 428,972 discloses a method to improve the transparency of a sheet prepared with the Ewen et al. SPP.

SUMMARY OF THE INVENTION

A polypropylene composition includes a blend of at least 85% SPP and up to 15% IPP. (In this disclosure, all percentages are by weight unless otherwise indicated). The composition may be molded into a medical article by a molding process of exceptionally high productivity resulting from an unexpected acceleration of the rate of crystallization of pure SPP achieved by blending the SPP with the IPP. The process includes the steps of blending the SPP and IPP, melting the blend, injecting the melted blend into a mold, holding the blend in the mold until the blend crystallizes and removing the solidified article from the mold.

The molded article of the invention has excellent tensile strength, modulus and impact resistance, is of exceptional clarity, and may be clear enough to use without adding a separate clarifying agent to the composition or including a post-molding processing operation. The molding operation itself is of high productivity due to the rapid crystallization of the blend which greatly reduces the hold time in the mold.

DETAILED DESCRIPTION

Figure 1:
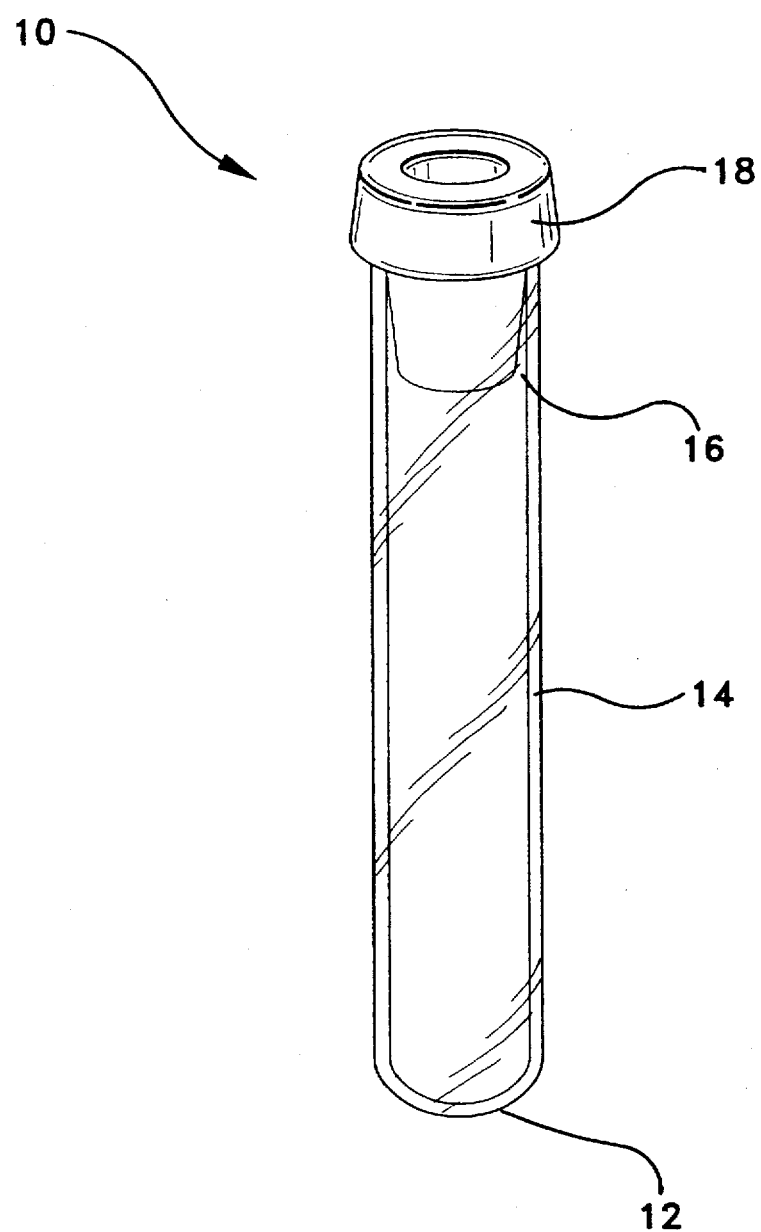
FIG. 1 is a perspective view of a tube of the invention having an open end.
Figure 2:
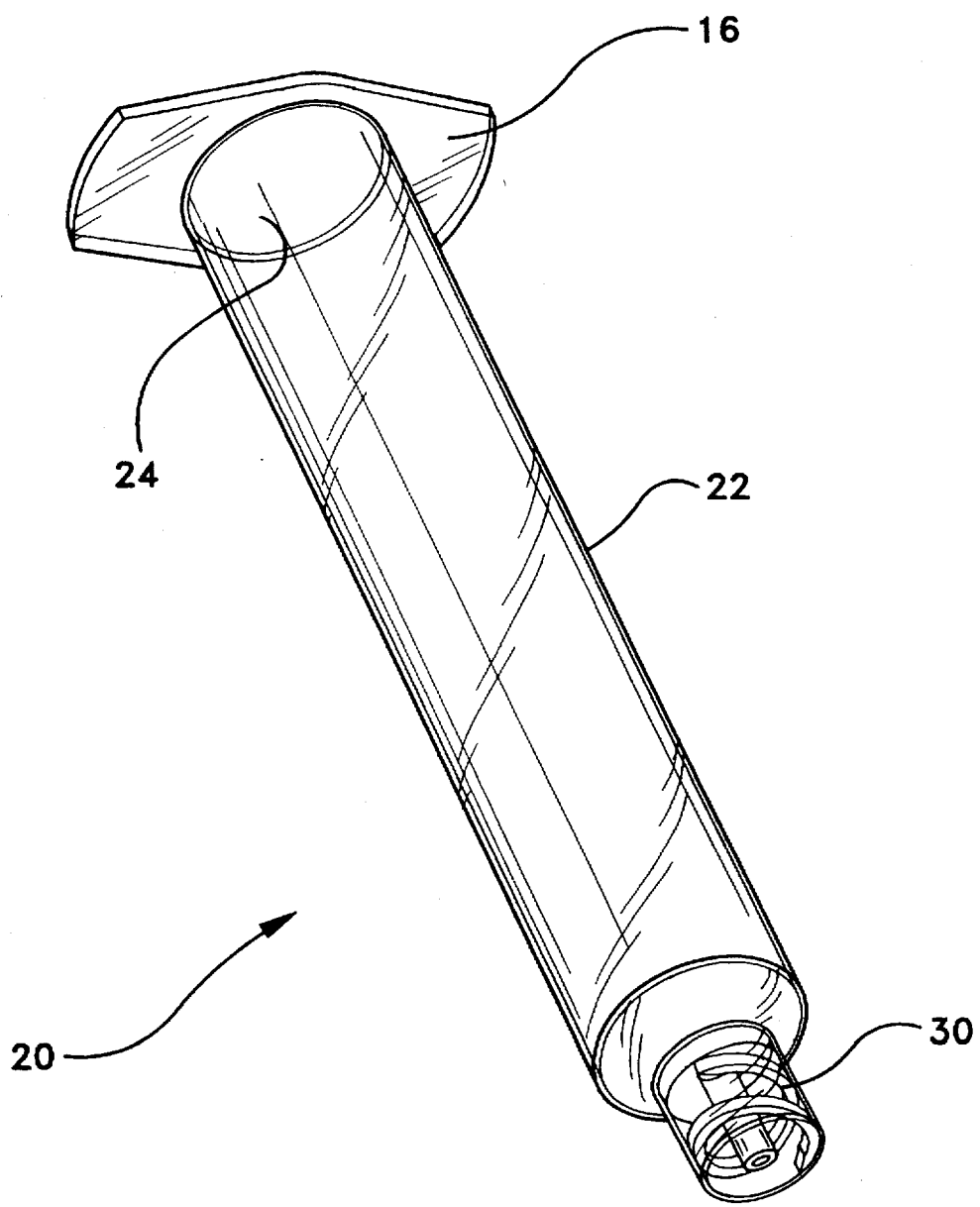
FIG. 2 is a perspective view of a syringe barrel.
Figure 3:
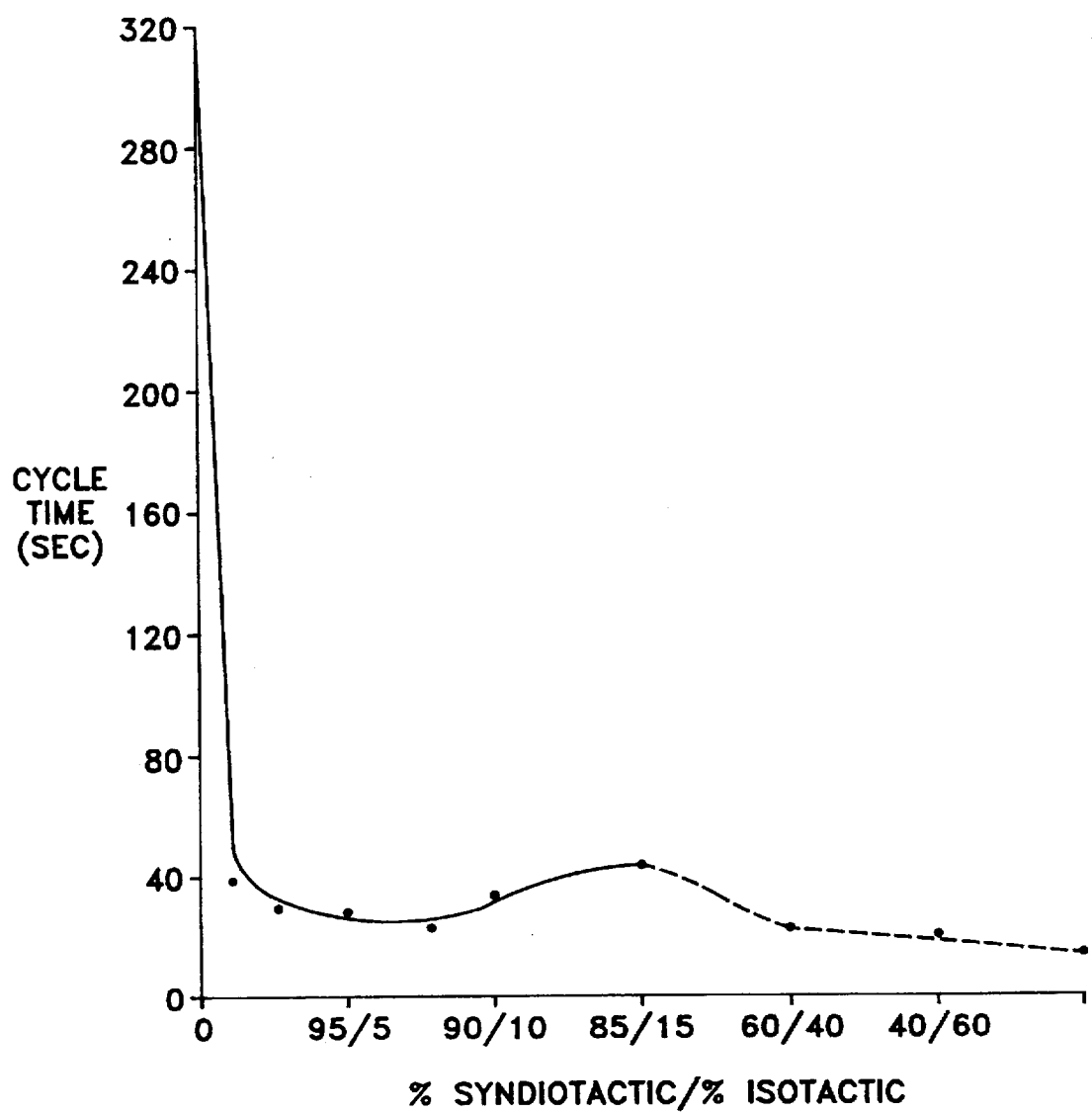
FIG. 3 is a plot illustrating the relationship of the ratio of the components of the composition to the molding cycle time.

While this invention is satisfied by embodiments in many different forms, there will herein be described in detail preferred embodiments of the invention, with the understanding that the present disclosure is to be considered as exemplary of the principles of the invention and is not intended to limit the invention to the embodiments illustrated and described. The scope of the invention will be measured by the appended claims and their equivalents.

The present invention contemplates any medical article which can be molded from a polymeric material. Preferred articles are those requiring a see-through capacity. The most preferred articles have a wall thickness of about 2 mm or less, such as blood collection tubes, centrifuge tubes, culture bottles, syringe stoppers and barrels and the like.

It has been found that melted SPP having a syndiotactic index of 80 percent or higher crystallizes very slowly, requiring a long hold time in the mold before ejection. Conventional nucleators, such as sorbitol, do not shorten the mold cycle time. Thus, in order to mold a plaque about 2 mm thick from the SPP of the aforementioned U.S. Pat. No. 4,892,851, a cycle time of about 320 sec. is required. Further, molding of the SPP is difficult and molded plaques, while of satisfactory clarity, are non-uniform and have wavy surfaces. After cooling and crystallization, the plaques stick to the mold making ejection difficult.

Conventional commercially available IPP, in contrast, has been found to mold easily with a short cycle time of about 15 sec. for 2 mm molded plaques. These plaques have poor clarity, as shown by an average haze of 24.7 and 50.6 for 1 and 2 mm thick plaques respectively when tested by ASTM D1003.

The composition of the invention may be prepared by blending the SPP of U.S. Pat. No. 4,892,851 with a suitable commercial IPP. The SPP may have a syndiotactic index of 80% or higher. A preferred SPP may have an index of 85%, most preferably 90% or higher. A convenient indicator of a suitable IPP is the peak melting point of the IPP wherein a higher melting point indicates higher isotactic purity. In accordance with the present invention, an IPP having a peak melting point of 163° C. or higher, as determined by conventional differential scanning colorimity (DSC), may be blended with the SPP in the molding composition. A preferred IPP has a melting point of 166° C. or higher. The most preferred IPP is a material known in the art as a super high IPP, and has a DSC peak melting point in the range of 168°–70° C. The IPP may be present in the blend at a concentration of 0.1 to 15%, preferably 2 to 8%.

The composition may additionally include effective quantities of any conventional additive as known in the polyolefin art such as, for example radiation stabilizers, fillers, coloring agents, antistatic materials, wetting agents, nucleators and the like, providing the desired physical properties, clarity, and moldability, are not adversely affected. Determination of suitable quantities of these additives is well within the purview of one of ordinary skill in the polymer and molding arts.

The SPP and IPP may be blended by any conventional melt compounding technique, preferably by twin screw extruding, prior to molding. Addition of the IPP greatly improves the moldability and reduces the high molding cycle time of the SPP by up to 12 fold. This improvement alone is sufficient to convert an inefficient and unprofitable molding operation to one of high productivity and competitiveness.

Testing of the blends of the invention for physical properties, clarity and mold cycle times was performed on molded 1 and 2 mm step plaques. Blending of the IPP into the SPP was found to have no deleterious effect on the physical properties of the SPP and in fact was found to result in about 10–20% improvement in strength. Table I sets forth the physical data obtained using ASTM procedures D638.

TABLE I

|  | SPP | 5% blend |
| --- | --- | --- |
| tensile (kg/cm$^2$) | 261 | 311 |
| modulus (kg/cm$^2$) | 1346 | 1787 |
| impact resistance (kg/cm$^2$) | 48 | 77 |

Clarity for the plastic articles of the invention may be given as the conventional percent haze value and may be determined by ASTM procedure D-1003 on 1 and 2 mm step plaques.

Cycle time may be determined on 2 mm step plaques as described in Example 5.

The following examples are given to further describe the invention but are not to be considered as limitative of the invention. In the examples, all melts were at 392° F. (200° C.) when injected into the mold, and the mold was at 70° F. (21° C.). All melts contained 0.25% of bis(p-methylbenzylidene) sorbitol nucleator, (MILLAD, 3940, Millikin Research Corp., Spartanburg, N.C.)

EXAMPLE I

A sample of SPP of 90% syndiotactic index was obtained from Exxon, Houston, Tex., melted and injected into the Arburg ALLROUNDER™ injection molding unit to prepare a 1 and 2 mm step plaque. Because of slow crystallization, a cycle time of 320 sec. was required for molding (since a step plaque was molded, the cycle time is given for the 2 mm thick section). The plaque was ejected with difficulty due to sticking and had a wavy surface. Haze values of 2.5 and 11.8 were determined be ASTM D 1003 using a Hunterlab Colorimeter Model D25P-2.

EXAMPLE II

Various commercial or experimental IPPs were obtained and peak melting points were determined by DSC. The samples were molded into 1 and 2 mm thick step plaques using the ALLROUNDER™ injection molding unit. Molding and ejection were easy, and cycle times of between 13 and 18 sec. were obtained. The haze values of these products is given below in Table II.

TABLE II

| IPP SAMPLE | mp | HAZE (%) 1 mm | HAZE (%) 2 mm |
| --- | --- | --- | --- |
| (1) Sumitono WF605MB | 167.33 | 16.5 | 51.8 |
| (2) Amoco 9439 | 166.33 | 12.0 | 46.6 |
| (3) Exxon (high isotactic) | 167.67 | 14.9 | 46.9 |
| (4) Chisso IPP (K-5028) | 168.0 | 10.3 | 34.0 |
| (5) Himont PF-091 | 163.0 | 69.8 | 74.0 |

EXAMPLE III

Preparation of Blends

Blends containing 95% of SPP of 90% syndiotactic index and 5% of the commercial IPP samples of Example II were prepared by melt compounding in a twin screw extruder (Haake Buchler Instruments, Inc.). The blended melts were molded into 1 and 2 mm step plaques and the cycle time and haze values determined. The data are set forth in Table III.

TABLE III

| BLEND | CYCLE TIME (sec) | HAZE (%) 1 mm | HAZE (%) 2 mm |
| --- | --- | --- | --- |
| 1) SPP-Chisso | 28 | 4.0 | 11.7 |
| 2) SPP-Amoco | 50 | 8.5 | 14.7 |
| 3) SPP-Sumitomo | 46 | 7.0 | 13.2 |
| 4) SPP-Exxon | 79 | 6.7 | 13.8 |
| 5) SPP-Himont | 145 | 5.8 | 12.6 |

It is seen from the table that by blending only 5% IPP into the SPP, the cycle time is reduced from 320 sec for pure SPP (Example I) by factors ranging from 2 to 12 fold. Haze values were somewhat higher than SPP for the 1 mm plaques, but virtually unchanged for the 2 mm plaques. Molding was generally very satisfactory with only slight sticking during ejection in blends 2 and 5. Thus, By blending small percentages of IPP into the SPP, the molding problems encountered in Example I with pure SPP were overcome, cycle times were reduced five fold, and haze was only marginally increased.

EXAMPLE IV

Preparation of Blends

Blends of SPP of 90% syndiotactic index and the Chisso IPP were prepared by melt compounding into compositions of various weight percent as described in Example III. The melts were molded into 1 and 2 mm step plaques. Cycle times and haze values are given below in Table IV and a plot of cycle time against composition is given in the Figure.

TABLE IV

| SAMPLE | | HAZE | | CYCLE TIME (sec) |
| --- | --- | --- | --- | --- |
| SPP (%) | IPP (%) | 1 mm | 2 mm | 2 mm |
| 100 | 0 | 2.5 | 11.8 | 320 |
| 99 | 1 | | | 39.4 |

TABLE IV-continued

| SAMPLE | | HAZE | | CYCLE TIME (sec) |
| --- | --- | --- | --- | --- |
| SPP (%) | IPP (%) | 1 mm | 2 mm | 2 mm |
| 97.5 | 2.5 | 7.6 | 15.2 | 29 |
| 95 | 5 | 4.0 | 11.7 | 28 |
| 92.5 | 7.5 | 7.4 | 15.0 | 23 |
| 90 | 10 | | | 32.1 |
| 85 | 15 | 6.5 | 21.1 | 43 |
| 60 | 40 | | | 24.4 |
| 40 | 60 | | | 19.9 |
| 0 | 100 | 10.3 | 34 | 13 |

From the data in Table IV, it is seen that cycle time reaches a minimum at about 7.5 weight percent of IPP and then, surprisingly, increases with increasing IPP. Using this preferred IPP of melting point 168° C., cycle times are reduced about 12 fold at the 2.5 to 7.5 weight percent level. The most preferred composition of the invention when both haze and cycle time are considered is about 5.0 percent IPP.

EXAMPLE V

Determination of Cycle Time

Cycle times were determined by injection molding 2"×3" step-plaques using a single-screw Arburg 20 ton machine. The thin side of the plaque was 1 mm and the thick side was 2 mm. The melt temperature was adjusted to an average of 392° F. and the mold was cooled to 60° F. Conditions and cycle time were adjusted to obtain a uniform plaque that did not stick to the mold cavity when ejected. The time corresponding to this condition was recorded as cycle time.

What is claimed is:

1. A method to prepare a medical article comprising:

a) injecting a melted blend of syndiotactic polypropylene having a syndiotactic index of at least 80 percent and about 0.1 to 15% by weight of an isotactic polypropylene having a peak melting point of 163° C. or higher into a mold;

b) holding said blend in said mold until said blend crystallizes in said mold to give an article having the shape of said mold; and c) ejecting said article from said mold, wherein method steps (a) to (c) are complete in a cycle time at least two fold less than the cycle time required to complete steps (a) to (c) with the pure syndiotactic polypropylene used in step (a).

2. The method of claim 1 wherein said article is a tube.

3. The method of claim 1 wherein said article is a syringe barrel.

4. A method to prepare a medical article comprising;

a) injecting a melted blend of syndiotactic polypropylene having a syndiotactic index of at least 85 percent and about 1 to 10 percent by weight of an isotactic polypropylene having a peak melting of at least 166° C. into a mold;

b) holding said blend in said mold until said blend crystallizes in said mold to give an article having the shape of said mold; and c) ejecting said article from said mold, wherein method steps (a) to (c) are complete in a cycle time at least four fold less than the cycle time required to complete steps (a) to (c) with the pure syndiotactic polypropylene used in step (a).

5. A method to prepare a medical article comprising:

a) injecting a melted blend of syndiotactic polypropylene having a syndiotactic index of at least 90 percent and about 2.5 to 7.5% by weight of an isotactic polypropylene having a peak melting point of at least 168° C. or higher into a mold;

b) holding said blend in said mold until said blend crystallizes in said mold to give an article having the shape of said mold; and c) ejecting said article from said mold, wherein method steps (a) to (c) are complete in a cycle time at least ten fold less than the cycle time required to complete steps (a) to (c) with the pure syndiotactic polypropylene used in step (a).

* * * * *